(12) United States Patent
Cheng et al.

(10) Patent No.: US 6,567,819 B1
(45) Date of Patent: May 20, 2003

(54) RUN TIME OBJECTS

(75) Inventors: Andy Cheng, Sunnyvale, CA (US); David Gary Deatherage, Jr., Los Altos, CA (US); Xiaodi Zhang, Sunnyvale, CA (US)

(73) Assignee: EBEST!, Inc., Santa Clara, CA (US)

( * ) Notice: Subject to any disclaimer, the term of this patent is extended or adjusted under 35 U.S.C. 154(b) by 0 days.

(21) Appl. No.: 09/545,400

(22) Filed: Apr. 7, 2000

(51) Int. Cl.$^7$ .............................. G06F 7/00; G06F 17/00
(52) U.S. Cl. ........................................ 707/103; 707/101
(58) Field of Search ........................ 707/103 R, 103 Y, 707/103, 103 Z, 101, 1, 2, 3, 4, 5, 203

(56) References Cited

U.S. PATENT DOCUMENTS

| | | | |
|---|---|---|---|
| 5,943,496 A | * 8/1999 | Li et al. | 709/328 |
| 6,016,495 A | * 1/2000 | McKeehan et al. | 707/103 R |
| 6,085,223 A | * 7/2000 | Carino et al. | 709/203 |
| 6,128,619 A | * 10/2000 | Fogarasi et al. | 707/102 |
| 6,141,660 A | * 10/2000 | Bach et al. | 707/103 R |
| 6,202,069 B1 | * 3/2001 | Blackman et al. | 707/103 R |
| 6,266,808 B1 | * 7/2001 | Govindaraj | 717/106 |
| 6,298,476 B1 | * 10/2001 | Misheski et al. | 717/101 |
| 6,324,568 B1 | * 11/2001 | Diec | 709/203 |
| 6,349,343 B1 | * 2/2002 | Foody et al. | 709/316 |
| 6,430,571 B1 | * 8/2002 | Doan et al. | 707/103 R |
| 6,473,748 B1 | * 10/2002 | Archer | 706/45 |

OTHER PUBLICATIONS

S. B. Yoo, K. C. Kim, and S. K. Cha (1999), A Middleware Implementation of Active Rules for ODBMS, pp. 347–354.*
Alexander Schill (1992), Controlling Dynamic Object Transfer Between Distributed Repositories, pp. 2.4.2,1–2.4.2.8.*

Bruce R. Millard, Partha Dasgupta, Sanjay Rao, and Ravindra Kuramkote (1993), Run–Time Support and Storage Management for Memory–Mapped Persistent Objects, pp. 508–515.*

Douglas Barry and Torsten Stanienda (1998), Solving the Java Object Storage Problem, pp. 33–40.*

Arthur M. Keller, Richard Jensen, and Shailesh Agarwal (1993), Persistence Software: Bridging Object–Oriented Programming and Relational Databases, pp. 523–528.*

Gregory A. Meinke (1996), Object Databases: Not Just for CAD/CAM Anymore, pp. 1–6.*

H. A. Jacobsen and O. Gunther (1999), Middleware for Software Leasing over the Internet, pp. 87–95.*

Robert Barta, and Markus Schranz (2000), Syndication with JML, pp. 962–970.*

* cited by examiner

*Primary Examiner*—Safet Metjahic
*Assistant Examiner*—Merilyn Nguyen
(74) *Attorney, Agent, or Firm*—Heller Ehrman White & McAuliffe

(57) ABSTRACT

The invention relates to a system and methods for creating object-oriented objects, comprising data and method(s), without any source code being compiled; invoking the method(s) of the objects without compilation and generation of object code; and using such classes and objects to create a software application.

36 Claims, 6 Drawing Sheets

RUN TIME OBJECTS

FIELD OF THE INVENTION

The invention relates to a system and methods for creating object-oriented objects, comprising data and method(s), without any source code being compiled; invoking the method(s) of the objects without compilation and generation of object code; and using such classes and objects to create a software application.

BACKGROUND

Object oriented technology pertains to a system or language that supports the use of objects. As used with respect to computer systems, the term "object" represents an encapsulated set of data and the method or a group of methods that are performed by a computer system upon that data. (Such methods are also called operations, method programs, routines, and/or member functions.)

Creating an object means creating an "instance" of a class, i.e., an object is an instance of a class. An instance is a named entity that has its own identity and value. An object's identity is the property that uniquely identifies that object, such as a unique object ID number.

A class is a description of a set of entities that share the same attributes, methods, and relationships. To create a class, a class definition has to be created. Each class definition comprises a data definition and a method definition. Data definitions define the information controlled by the object, and method definitions define the method or methods of such objects.

Objects and classes, in addition to having both data and method(s), also have other characteristics or properties such as inheritance. Inheritance is the transfer of the characteristics of a class in object-oriented programming to other classes derived from it. For example, if "car" is a class, the classes "four-door" and "two-door" may be derived from it and each inherits the properties of the "car" class, such as needs gas, has four wheels, and the like. One of ordinary skill in the art understands that other types of characteristics and properties may be added in a class or in an object, such as polymorphism, state, events, and the like.

Currently, objects and classes are created through writing source code(s). A source code is a human-readable program containing statements written in a high-level language that is not directly readable by a computer. A source code cannot be used by a computer unless it has been compiled successfully. An object code is the machine code or instructions generated by a compiler or an assembler, that was translated from the source code of a program. The machine code generated is directly executed by the system's (or computer's) central processing unit.

Objects and classes are currently created using object oriented programming languages such as C++ and Java. Using these objects and classes, a software application, may be created. A software application is a program designed to assist in the performance of a specific task, such as accounting, online purchasing, inventory management, and the like. Objects and classes may be construed as building blocks to create a software application.

An online purchasing software may contain, for example, a class called "item" and an object called "doll," and may be written in C++. The classes and objects defined in such a source code may not be used until the source code is compiled successfully to create new objects and classes, such as objects in a Dynamic Link Library (DLL). This means that the programmers writing the source code not only must know the programming syntax of the language (e.g., must know what "class," "++", "return," or "public" in C++ means), but also need to know how to use such languages to define objects and classes. Object oriented programing requires a substantial amount of learning and expertise.

Generally, programmers also use these objects and classes to map information to a database, e.g., a relational database. This means that although objects encapsulate both data and method or group of methods, the data ultimately reside in physical form, e.g., in a computer hard drive which are stored and accessed by a relational database management system (RDBMS). Microsoft® SQL Server and Oracle's RDBMS products are examples of RDBMS. Using objects and classes, data stored in a computer-readable medium may then be created, modified, and manipulated by the method or group of methods defined in the object or class (assuming the source code is compiled successfully).

Thus, a way to create classes and objects without the high learning curve required to learn the complexities of high level languages and the complexities of defining objects and classes using such languages is required. Furthermore, a way to create and use classes and objects immediately after their definition is needed. This leads to faster deployment of the classes and objects thereby minimizing development time of a software application and facilitating earlier debugging of classes and objects created, particularly, when there is a need to make rapid changes to such objects and classes.

SUMMARY

In a first aspect, this invention provides a method of creating objects immediately after the creation of a class, without the need for compiling source code(s) containing objects and classes. The first step in this invention is to define a class such that the class contains a data definition and a method definition and where such data definition and method definition are delimited to distinguish one piece of information from another. Once the class is defined, the class is created by saving it in a computer-readable medium, such as in a database to enable later retrieval and modification. This enables a user to modify or redefine the class.

Once a class is defined, object or objects may then be created based on such created class. The object or objects are also saved in a computer-readable medium to enable the objects to be later modified or redefined.

These objects and classes may then be used as building blocks or components to create a software application. The methods of such classes or objects may then be executed, all without the need of source code compilation.

In a second aspect of the invention, classes are not created, however, the class definitions are incorporated as part of the object. The object contains both a data definition and a method definition. Similar to the above aspect of the invention, such objects may be redefined and modified, and may be used as building blocks or components to create a software application without the need for compiling a source code.

In another aspect, this invention provides a system which comprises a class definer, a class database, an object definer, an object database, a message receiver, and a web server software. The class definer enables a user to define classes, while the class database contains the classes for later retrieval and modification. The object definer enables a user to define objects, while the object database contains the objects defined for later retrieval and modification. The message receiver receives messages and sends instructions accordingly. The web server software receives and executes such instructions, particularly, the methods of the objects.

In another aspect, this invention provides a system similar to the one described above, however, without the class definer and the object definer. The message receiver receives messages and sends instructions accordingly, including instructions to create classes and/or objects in a database system.

In summary, it may be said that the systems and methods of the invention eliminate the requirement for conventional source code and compiled object code in object oriented programming by providing for direct use of classes and objects immediately after definition and creation. The class and object definitions so stored may be interrelated to comprise a program system or software application to produce a programmed real-world useful function. This is greatly needed particularly in the development of Internet-related applications.

These database records collectively comprise the equivalent of the instructional code of conventional programs, and may be run, for example, by a web server software to accomplish the functional real-world objectives.

The systems and methods of the invention have broad applicability to object oriented programming functions generally. The invention is of a particular value in object-oriented programming functions where multiple users in remote locations contribute to a collective object oriented functional system, since conventional database software, (e.g., RDBMS) can store classes and objects created and be used by a multitude of remote contributors/users.

The rapid growth in the industrial and commercial application of Internet connectivity makes the advantages of the invention especially pertinent. For example, the invention may be employed in a e-commerce web-based computer system for online purchasing, online contact management system, and the like.

Still other advantages will be evident from a review of the Summary, Drawings, Detailed Description, and Claims.

BRIEF DESCRIPTION OF DRAWINGS

This invention is illustrated by way of example by the reference to the following drawings, in which.

DETAILED DESCRIPTION OF THE INVENTION

Figure 1:
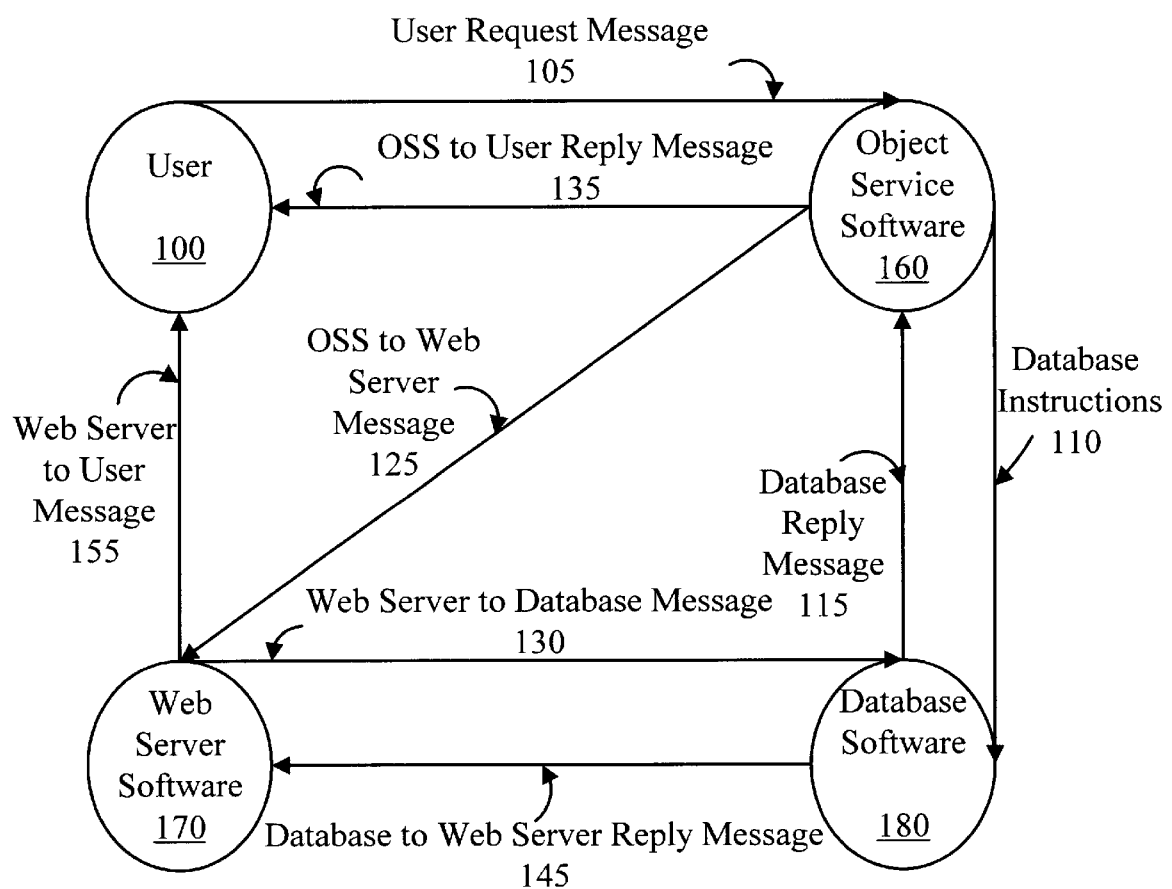
FIG. 1 is an exemplary data flow of the current invention.

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

The invention will be described by way of illustration with reference to the Extensible Markup Language (XML) specification (further discussed below) and storing objects and classes in a relational database management system (RDBMS), but it should be understood that these objects and classes may be marked or tagged in any specification other than XML, and the objects and classes may be stored in a non-RDBMS database, such as in plain ASCII text files.

In addition, the method and system of the invention is illustrated by way of an Internet-based example, including web server operations. However, it should be understood that the system and method may be carried out by means of stand-alone computer systems or LAN/WAN networks.

Extensible Markup Language (XML) is a subset of the Standard Generalized Markup Language (SGML). SGML is a means of providing platform- and application-independent documents that retain formatting, indexing, and linked information. XML uses tags to delimit data, such as text and graphics, in a document. A tag comprises a less than sign "<", a tag name, and a greater than sign ">." Generally, data are delimited between a start tag, e.g., "<Name>," and an end tag, e.g., "</Name>," with the end tag exactly like the start tag except a slash ("/") precedes the tag name. Data delimited by a start tag and an end tag is generally called an element, and the data between the start and end tags are called the element's content or value. Thus, "<Name>John Doe</Name>" defines an element called "Name" containing a value of "John Doe." Alternatively, a piece of information may be delimited as containing an empty element. A tag ending with a "/>" signals that the element has no contents (e.g., the tag "<property>" is equivalent to writing "<property></property>") However, using the empty element tag enables a user or programmer to define properties or attributes of the element. For example, "<property name="Purchase_ID" type="string"/>" indicates that the Purchase_ID has a property type string, but no value or content is indicated.

Table I is a sample listing of how a class, ebObj.Purchase, is defined in the present on using the Extensible Markup Language (XML).

TABLE I

Sample Class Definition of the Current Invention

| Line # | XML Statements | Section |
|---|---|---|
| 1 | <class type="ebObj.Purchase"> | Object Def. |
| 2 | <property name="Purchase_ID" type="string"/> | Data Definition |
| 3 | <property name="Description" type="string"/> | Data Definition |
| 4 | <property name="Amount" type="numeric"/> | Data Definition |
| 5 | <method name="closeDeal"> | Method Def. |
| 6 | <parameters> | Input Parameter |

TABLE I-continued

Sample Class Definition of the Current Invention

| Line # | XML Statements | Section |
|---|---|---|
| 7 | <value name="closeAmount" type="numeric"/> | Input Parameter |
| 8 | <value name="byWhom" type="string"/> | Input Parameter |
| 9 | </parameters> | Input Parameter |
| 10 | <result> | Return Value |
| 11 | <value type="boolean"/> | Return Value |
| 12 | </result> | Return Value |
| 13 | <body script="VBScript"> | Scripting Lang. |
| 14 | if byWhom = "Dist" or byWhom = "NonProf" then | Method |
| 15 | me.amount <= closeAmount | Method |
| 16 | me.stage = "closed" | Method |
| 17 | closeDeal = true | Method |
| 18 | else | Method |
| 19 | closeDeal = false | Method |
| 20 | end if | Method |
| 21 | </body> | Method |
| 22 | </method> | Method Def. |
| 23 | </class> | Object Def. |

The class being defined is stated in line 1 ("ebObj.Purchase"). Lines 2, 3, and 4 collectively contain the data definition of the class ebObj.Purchase. The data definition in this embodiment describes the data used in the class ebObj.Purchase. Lines 2, 3, and 4 also state that the class ebObj.Purchase contains three sets of data, namely, "Purchase_ID" (line 2), "Description" (line 3), and "Amount" (line 4). Each set of data is defined to have its own data type such that "Purchase_ID" and "Description" are string data types and "Amount" is a numeric data type. A data type defines the acceptable range of values, the operations that may be performed on the values, and, optionally, the way in which the values are stored in memory. Some other data types are real, integer, floating point, character, string, Boolean, and pointers.

The method definition of ebObj.Purchase is defined in lines 5 to 22. Line 5 states the the class ebObj.Purchase contains a method called "closeDeal." Lines 6, 7, 8, and 9, particularly lines 7 and 8, contain the names of the input parameters that the method closeDeal accepts (e.g., the parameter called closeAmount is a numeric type). Lines 10, 11, and 12, particularly line 11, show what the method closeDeal returns. In this sample listing, the closeDeal method returns a boolean value, which is either a "true" or a "false."

Line 13 states that the method of ebObj.Purchase is written using VbSciprt. VBScript is the Visual Basic Scripting language. Lines 14 to 20 define the method of the class. In this invention, it is preferred that the method be written as a script, such as by defining the method using Microsoft® VBScript, Microsoft® Active Server Page, or Allaire® ColdFusion. Scripts are programs that contain instructions that can be executed, for example, by a web server software. Lines 21, 22, and 23 are end tags to delimit the elements.

A person of ordinary skill in the art will appreciate that other additional information may be added in defining a class or an object, such as inheritance, events, a list of what other classes may receive the output of the method or use this class, and additional methods. Furthermore, this invention is not limited to defining classes, objects (further discussed below), and user request messages (further discussed below) by delimiting them by tags conforming to XML. Other delimiters, such as "[ ]", commas, and the like may be used to distinguish one piece of information from another.

Table II shows how an instance of a class, that is an object, may be defined using XML, and in particular, it shows how an object from the ebObj.Purchase class (Table I) is defined. Table II may represent a purchase object.

TABLE II

Sample Creation of Object

| | |
|---|---|
| 1 | <obj type="ebObj.Purchase"> |
| 2 | <property name="Purchase_ID">AXN10009</ property > |
| 3 | <property name="Description">This is a doll purchase.</property> |
| 4 | <property name="Amount">250000.00</ property > |
| 5 | </obj> |

Line 1 of Table II identifies that the object is derived from the ebObj.Purchase class. Line 2 identifies the purchase number, "Purchase_ID," of the present object. The object is identified with the value "AXN10009" (line 2). The other two sets of data, as defined in the ebObj.Purchase class, are contained in lines 3 and 4. "Description" contains the value "This is a doll purchase." "Amount" contains the value "250000.00." The methods of this object, "AXN10009," is obtained from the method definition of the class ebObj.Purchase (lines 5 to 22 of Table I). Optionally, additional method definition information pertinent only to the object AXN10009 may be added in this object definition, using the same syntax as shown in Table I (see lines 5 to 22).

FIG. 1 shows the data flow of the present invention. A user 100 sends a user request message 105 to the Object Service Software (herein, referred to as "OSS") 160. The user request message 105 contains information such as whether a class or an object needs to be created or modified and/or whether the methods or method of the object needs to be executed. Modified means that the data may be manipulated, updated, deleted, or changed. The text in Table I, for example, may be incorporated into a user request message 105 to inform the OSS 160 to create a class, while the text of Table II may be incorporated into a user request message 105 to inform the OSS 160 to create an object. The text of both Table I and Table II may also be incorporated into one user request message 105.

The OSS 160 is a program that may be written in a high-level language, such as C, C++, Visual Basic, Fortran, and the like. It may also be written in scripting language such as VBScript or Cold Fusion. The OSS is a program that handles the creation and modification of classes and objects. It may also handle the retrieval of such classes and objects, as well as passing pertinent information retrieved to the proper entity, such as another software (e.g., web server software, a user's browser, to another database, and the like). The OSS also reads the user request message and translates that user request message to database instructions, such as instructing a database software 180 to insert or modify a record containing information about an object or a class.

Once the OSS 160 receives the user request message 105, the OSS 160, depending on the contents of the user request message received, sends database instructions 110 to the database software 180. The database software 180 may be a relational database management system (RDBMS) such as a Microsoft SQL Server or an Oracle® RDBMS product. The database instructions 110 sent by the OSS 160 to the database software 180 are instructions written in Structured Query Language (SQL). SQL is a database language used in querying, updating, and managing relational databases.

If the OSS 160 receives a user request message 105, for example, containing the text of Table I, the OSS 160 instructs the database software 180, through the database instructions 110, to insert a class record in the class database. This class record contains the class definition as defined and contained in the user request message 105. On the other hand, if the OSS 160 receives a user request message 105 containing the text of Table II, the OSS 160 instructs the database software 180 to insert an object record (containing the object as defined in the user request message) in the object database. The fields in the object and/or class database may include, object name, data definition, input values, method name, method instructions, and the like. Depending on the design of the class database and/or object database, the information about the object and/or class may be stored among multiple databases, tables, and/or records. Furthermore, the class database and the object database may also be contained in one database.

Once the database software 180 executes the database instructions 110 sent by the OSS, the database software 180 then sends a database reply message 115 to the OSS 160. The database reply message 115 may contain information needed by the OSS to do further processing, such as error handling, passing the methods to the web server software 170, sending an OSS to user reply message 135, and the like.

For example, once the OSS 160 receives a user request message 105 containing the text of Table II and after the database software 180 inserts an object record into the object database, the database software 180 then sends to the OSS 160 via a database reply message 115 the unique object ID number of the of the object just created. The OSS 160 then sends an OSS to user reply message 135 stating that "Object ebObj.Purchase AXN10009 was created successfully. The unique object ID number is 0-5001-1001." The unique object ID number is a number generated by the OSS enabling the OSS to identify such object and which may also be stored or saved in the class database and/or object database. The OSS to user reply message 135 may also be in a form of a web page displayed on the user's Internet browser.

In an alternative embodiment of the invention, once the OSS 160 receives a user request message 105 containing the text of Table II, the OSS sends an OSS to web server message 125 to the web server software 170 instructing the web server software 170 to send SQL statements 130 (via the web server to database message) to the database software 180 to insert an object record in the object database. After the database software 180 executes such SQL statements, it then sends back the unique object ID number of the object just created via the database to web server reply message 145. After receiving this message, the web server software 170 then sends a web server to user message 155 stating that "Object ebObj.Purchase 0-5001-1001 was created successfully."

A user may also send a request instructing the OSS to have a method of the object be performed. The text of Table III shows an example of text, written in XML, which may be incorporated into such a user request message 105.

TABLE III

Sample Listing to Execute the closeDeal Method

| 1 | <obj type="ebObj.Purchase" Purchase_ID="0-5001-1001"> |
| 2 |   <method name="closeDeal"> |
| 3 |     <parameters> |
| 4 |       <value name="closeAmount">250000.00</value> |
| 5 |       <value name="byWhom">"Dist"</value> |
| 6 |     </parameters> |
| 7 |   </method> |
| 8 | </obj> |

A user request message 105 containing the text of Table III, in particular, is informing the OSS 160 that the closeDeal method (line 2) of the object identified with the unique object ID number "0-5001-1001" (line 1) has to be executed. The value 250000.00, line 4, of the closeAmount parameter and the value "Dist," line 5, of the. byWhom parameter are to be passed to the closeDeal method identified in line 2. Because the object with unique object ID number "0-5001-1001" is an instance of the ebObj.Purchase class as defined in Table 1, the closeDeal method of that object is derived from that class (Table I lines 5 to 22). It is preferred that classes, objects, and messages are defined using the XML specification.

If the OSS 160 receives a user request message 105 containing the text in Table III, the OSS 160 retrieves the class definition of the ebObj.Purchase stored in the class database, particularly the method definition containing the closeDeal method, by sending database instructions 110 to the database software 180. The database software 180 in turn sends the method definition retrieved (Table I lines 5 to 22) via the database reply message 115. The database reply message 115 may then be forwarded to web server software 170 via an OSS to web server message 125. The database reply message 115 received and then forwarded to the web server software 170 via the OSS to web server message 125 may be modified to enable the web server software 170 to read and execute the closeDeal method instructions. Because the method or group of methods is typically defined using scripting language, the web server software 170 thus reads such methods contained in the OSS to web server message 125, and accordingly, executes the instructions.

In an alternative method of the invention, the OSS 160 receives the user request message 105, as in the previous example. However, instead of the OSS sending database instructions 110 directly to the database software 180, the OSS sends instructions 125 to the web server software 170 to retrieve the method definition of ebObj.Purchase (via the OSS to web server message 125). The web server software 170 in turn then sends the proper SQL instructions 130 (via the web server to database message) to the database software 180. The database software 180 in turn returns the method definition 145 (via the database to web server reply message) containing the closeDeal method to the web server software 170. The web server software 170 in turn executes the method as defined in the closeDeal method, taking into account parameter values and the like. The web server software 170 in turn may also respond directly back to the user 155 (via the web server to user message) by sending back the results of the closeDeal method (e.g., to confirm object creation and report unique object id number). Such web server to user message 155 may be in a form of a web page containing a message stating that "The purchase of doll is completed at $250,000.00 Thank you."

One of ordinary skill in the art will appreciate that the OSS may be augmented to include other extra capabilities such as instructing the web server software 170 to automatically generate web pages or automatically send e-mails to designated parties.

For example, once the database software 180 inserts an object record containing the object defined in Table II, the web server software may also send emails to a programming development team stating that "Object ebObj.Purchase 0-5001-1001 is now available for use."

Figure 2:
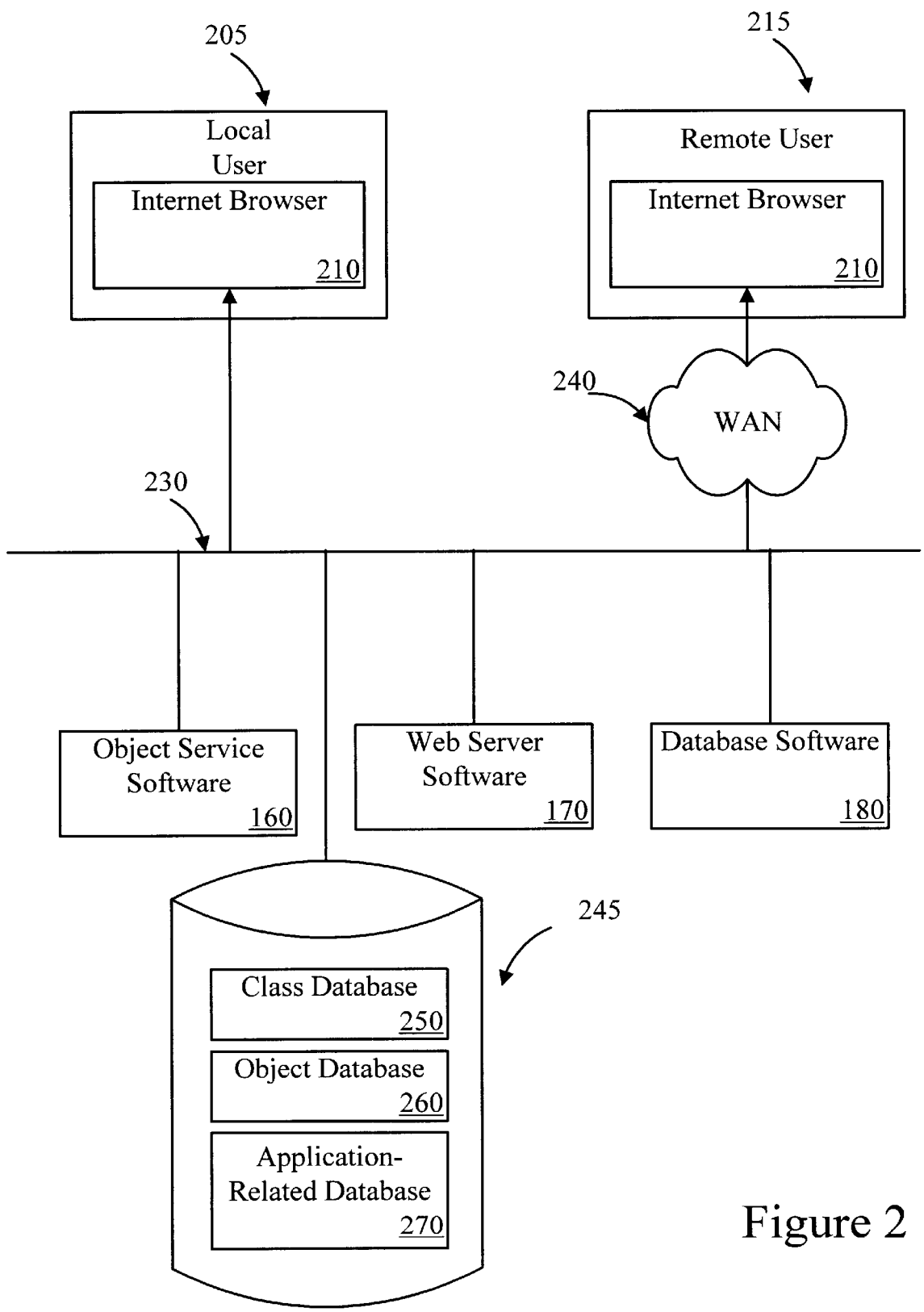
FIG. 2 is a block diagram illustrating an embodiment of the present invention over a network system.

FIG. 2 shows how to implement the present invention with a standard Internet or Intranet web server software 170. A user, whether local 205 or remote 215, is connected to a local network 230 or a wide area network 240 and preferably connected to an OSS 160, web server software 170, a database software 180, and an associated database 245 via an internet browser 210. Microsoft® Internet Explorer is an example of an Internet browser.

The web server software 170 in this invention is preferred to provide the capability to send web pages, and process and execute scripts. The web server software 170, database software 180, and the object service software (OSS) 160 are connected to a local area network 230 which may also be connected to the Internet through a wide area network 240. The web server software 170 and the OSS 160 may be located in the same computer to minimize network traffic. The database software 180 may be located in a separate computer.

Databases, including a class database 250, an object database 260, and other application-related database(s) 270 are stored in a computer-readable medium. The class database 250 contains the classes, while the object database 260 contains the objects. The application-related database 270 contains the data that may be read, processed, and manipulated by the method definitions or are data specified in the data definition of the classes or objects defined. The object database may also be an application-related database. For example, a purchase database and an item database may represent the application-related database 270 to be used by the class and object defined in Tables I, II, and III. Referring to Table I, the me.amount (line 15) may represent the cost of the item. Thus, when Table III is contained in a user request message, the closeAmount parameter (250,000.00) (Table III line 4) is passed to the method closeDeal and compared to the me.amount (Table I line 15). Assuming that the closeAmount (e.g., the purchase price), 250,000.00, which is the input parameter, is greater than the me.amount the closeDeal then is set to "true" (Table I line 17).

Although objects and classes may be saved as plain ASCII files or in other file formats, it is preferred, however, that the objects and classes be saved in a RDBMS to faciliate access and retrieval.

Because the method definitions of the invention are preferably written in scripting languages, a software that reads the scripting language as defined in the class (e.g., line 13, VBScript) is included in the complete system. Thus, if the method (lines 14 to 20 in Table I) in the class is written as a Microsoft® Active Server Page (ASP), then a web server that processes and executes the ASP script, such as an Microsoft® Internet Information Server is used as the web server software 170.

Referring to FIG. 2 again, the operation of the method of the invention may be initiated by a local user 205 or a remote user 215 requesting that a class be created. In an Internet embodiment of the invention, the user, for example, accesses a web site through an Internet Browser (210). The OSS may serve the web site, thus, also acting as a web server. The user then clicks on an option on the web page, for example, an option to create a class. By clicking on this option, an online form is made available to the user to define the class. The user defines a class, for example, by entering the text contained in Table I in the appropriate input boxes on the form. Once the user defines the class and clicks the "SEND" button, appropriate instructions (equivalent to user request message 105 in FIG. 1) is then sent from the form to the OSS 160. The OSS in turn sends the corresponding database instructions (110 in FIG. 1) (that is, in this case, to create a record of the class definition) to the database software 180. The class as defined by the user thus is stored and saved in a class database 250 for later retrieval. By employing the invention this way, remote users may define classes and objects at any time and from any place via worldwide Internet access. Furthermore, once the objects or classes are saved in the database, they are created and thus made available for the use of others also via Internet access. Modifications of classes and objects may similarly be done as described above.

An alternative way to use the system of the invention is for the user to create an ASCII file containing the user request message (105 in FIG. 1). This ASCII file may then be sent using a file transfer protocol to a computer location that is monitored by the OSS (160 in FIG. 1). The OSS then reads the user request message (105 in FIG. 1) contained in the ASCII file and sends database instructions (110 in FIG. 1) accordingly to the database software (180 in FIG. 1), as described above. A user may use various conventional methods to transmit a user request message 105 so as to be received in computer-readable medium by the OSS.

In the methods and systems of the invention, the conventional way of creating source codes containing objects and classes, and compiling such source codes are thus eliminated. Furthermore, the need for specialized programming skills currently required for object-oriented programming is also eliminated.

Figure 3:
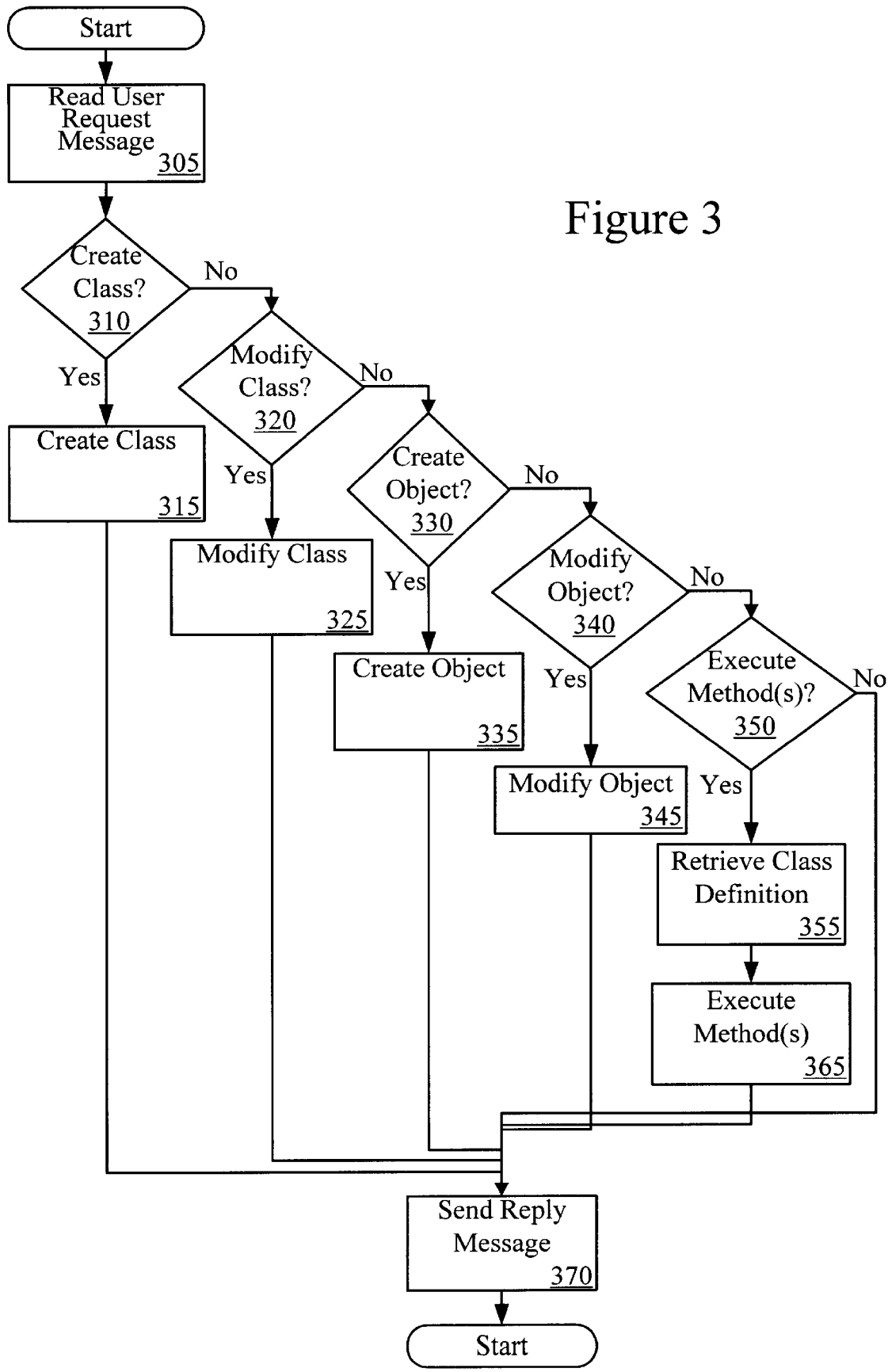
FIG. 3 is a flowchart of how a message sent by the user may be processed.

FIG. 3 shows an embodiment of the basic logic flow of the OSS 160. The OSS reads the user request message (105 in FIG. 1) at step 305. If the user request message contains information on creating a class 310 (e.g. Table I text), the OSS then creates a class 315 by inserting a class record into the class database (250 in FIG. 2). If it contains information on modifying a specific class 320, the existing class stored in the class database is retrieved and modified 325. Similarly, if the user request message contains information on creating an object 330 (e.g., Table II text), the OSS creates an object 335 by inserting an object record into the object database (260 in FIG. 2). If it contains information on modifying a particular object 340, the existing object in the object database is retrieved and modified 345. If the user request message, however, contains information to execute an object's method(s) 350 (e.g., Table III text), the OSS retrieves the class definition 355 from the class database (250 in FIG. 2), particularly the method definition (e.g., lines 5 to 21 in Table I). The OSS (160 in FIGS. 1 and 2) or the database software (180 in FIGS. 1 and 2) then sends the method definition (e.g., via the OSS to web server message 125 in FIG. 1 or database to web server reply message 145 in FIG. 1), including other information to the web server software to execute 365. A reply message, such as the OSS to user reply message (135 in FIG. 1) or a web server to user message (155 in FIG. 1) may also be sent back to the user (100 in FIG. 1) as shown in step 370.

Figure 4:
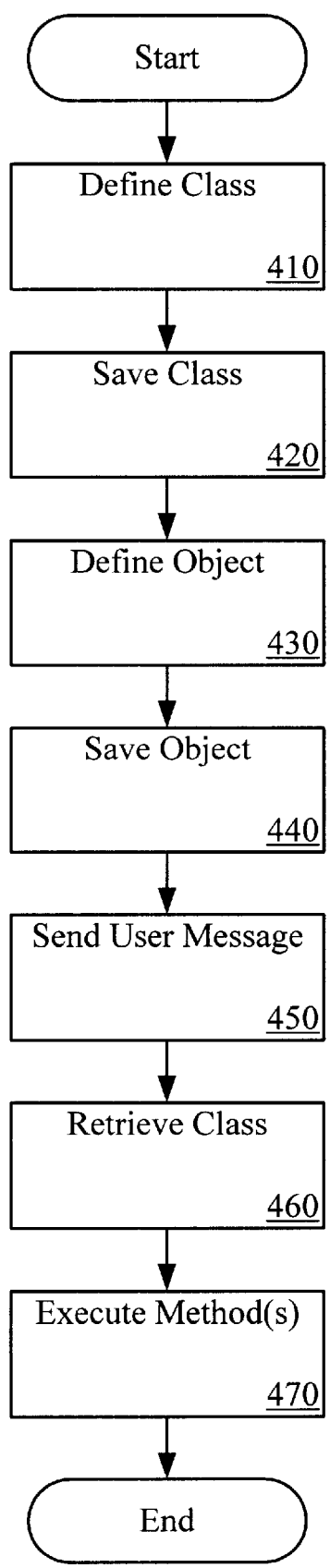
FIG. 4 is a flowchart of how an object's method or group of methods may be executed.

FIG. 4 shows an embodiment of the invention where an object's method is executed without any source code being compiled. First, a user defines a class 410 (e.g., Table I), which is then saved 420 in a class database. Once the class is created, that is defined and saved, it is available for use, such as for creating objects. Next, a user defines an object 430 (i.e., the instance of the class created in step 420) (e.g., Table II), which is then saved 440 in an object database. A user may then request that the method(s) of the object be executed 450, by sending a user request message. The class saved in step 420 is then retrieved 460, particularly, the method definition, of the class from which the object was instantiated. The method or methods contained in the method definition retrieved are then executed 470, for example, by a web server software.

The classes and objects of the present invention may be interrelated to comprise a software application to produce a programmed real-world useful function, such as an online purchasing software. Furthermore, having the classes and objects available upon their creation facilitates development and deployment of software applications, including, making online modifications. These database records, particularly, the classes, collectively comprise the equivalent of the instructional code of conventional programs, and may be run by a web server software or any software capable of running interpretive languages or scripts to accomplish the functional real-world objectives. (Interpretive languages are computer languages in which programs or source codes need not be compiled.)

Figure 5:
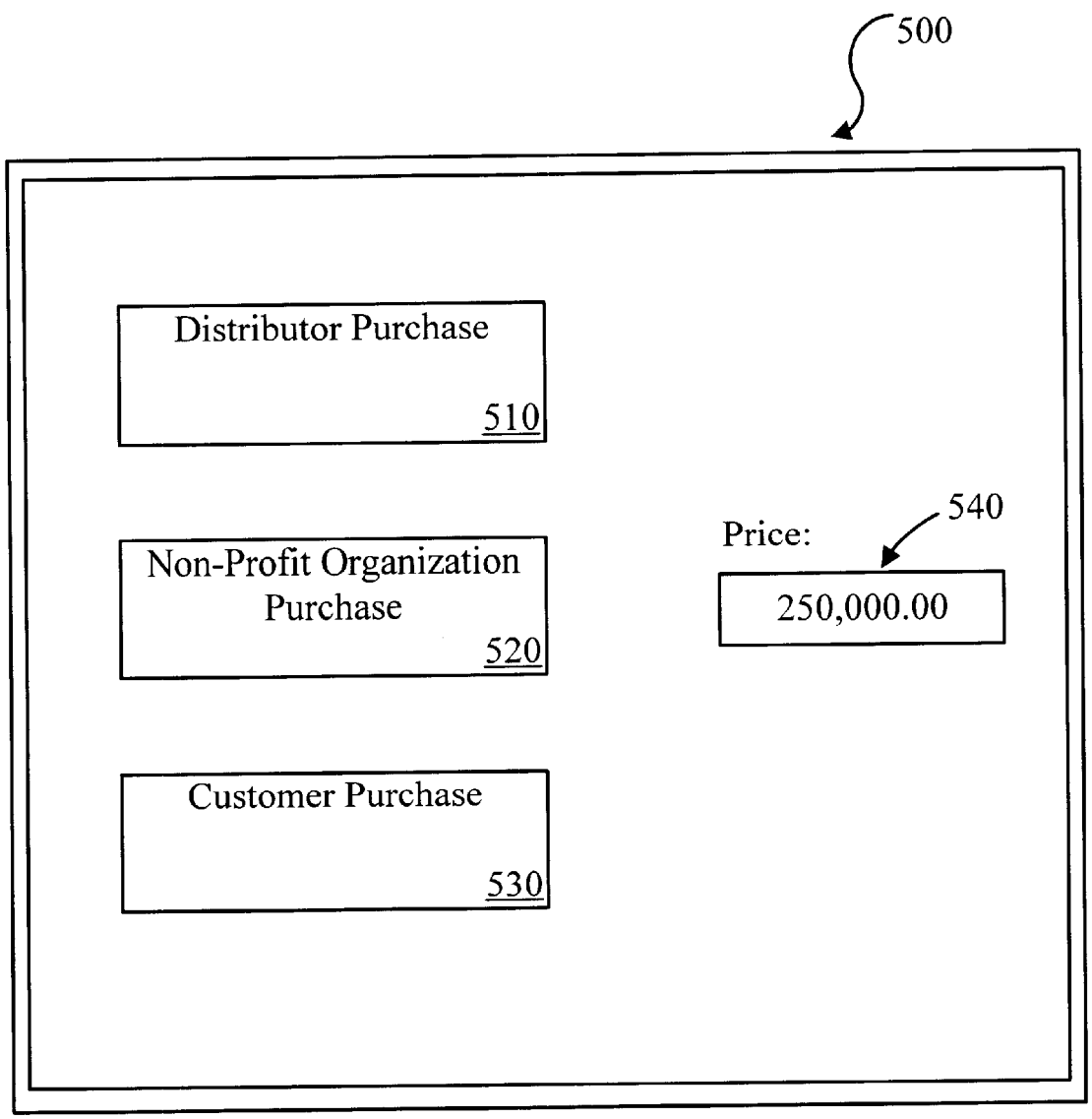
FIG. 5 is a sample web page employing the features of the present invention.

FIG. 5 shows a form or a web page 500 employing the features of the present invention. This web page is presented when a purchaser accesses a certain web site. This web page may be dynamically created by a script, in conjunction with a web server software or may be a pre-written hypertext mark up language (HTML) file. This web page 500 may also be displayed by a method of a pre-existing object.

This web page, for example, illustrates an online purchase where a purchaser has entered $250,000, the purchase price, (which equates to the closeAmount in Table I line 7) in the input box 540. The distributor purchase 510, the non-profit organization purchase 520, and the customer purchase 530 buttons indicate that the purchaser is a distributor, a non-profit organization, and a regular customer, respectively. In addition, each button may be associated to a value such that the distributor purchase 510, the non-profit organization purchase 520, and the customer purchase 530 buttons are associated with "Dist", "NonProf," and "Cust," respectively. (Associating a value to a button is widely known in the art).

Figure 6:
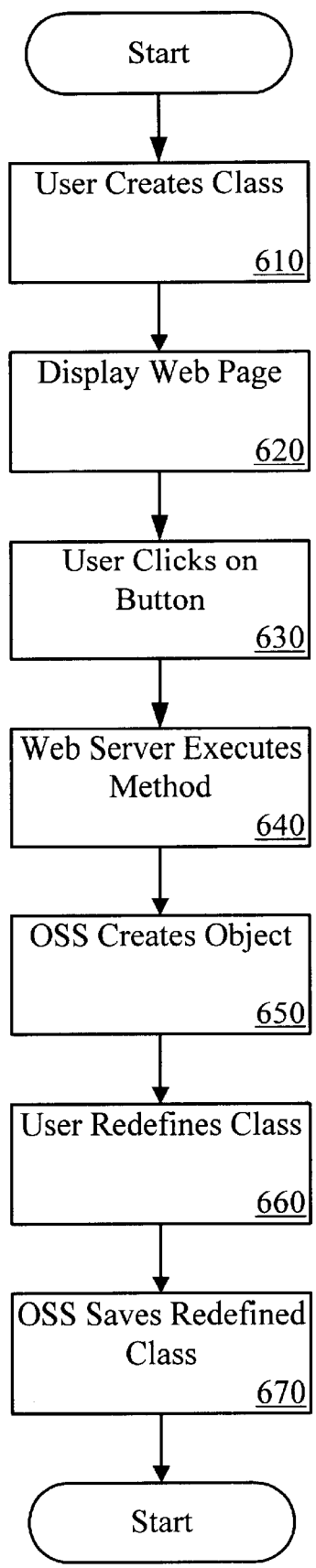
FIG. 6 is an exemplary flowchart using the features of the present invention to create a software application.

FIG. 6 is an exemplary flowchart using the features of the present invention to create a software application. It illustrates how a user or programmer uses classes and objects to create a software application. To use classes and objects in a software application, the user or programmer first creates a class 610, as described above.

A purchaser, not necessarily the same person who created the class, who wishes to purchase a doll, for example, accesses an online purchasing web site. A web page (500 in FIG. 5) is displayed 620 by a web server or by the OSS. The purchaser enters the purchase price (540, in FIG. 5) and then clicks a button 630. Assuming the purchaser clicks the distributor purchase button (510, in FIG. 5), the value associated with the button, in this case, "Dist," is sent back, along with the "250,000.00" price entered in the input box (540 as shown in FIG. 5), to the web server which served (or made available) such web page (500, in FIG. 5).

Typically, the values of the form, including, input data entered by the purchasers are sent back to a script (herein referred to as an object processing script) via the Internet browser. The object processing script contains logic such that the values returned trigger a user request message (105, in FIG. 1) to the OSS, for example, to execute an object's method. This is accomplished by having the method to be executed retrieved and then executed by a web server.

The user request message, for example, may contain the text in Table III. The method, closeDeal, is then executed 640, as described above. The user request message may also contain text, e.g., contained in Table II, to keep track of online purchases, thus an object is accordingly created in step 650 and is stored in an object database or in an application-related database. More than one object may be created from a single class.

At any time the user or programmer decides to modify the class, such as by redefining the class, the user may do so by sending a user request message (105 in FIG. 1) to the OSS containing a redefinition of the class. (A class may be redefined by deleting the class, modifying the methods in the class, modifying the data definition of the class, and the like). For example, if the logic in line 14 of Table I is to be changed to now exclude Distributors, the entire text of Table I is incorporated to the user request message but with line 14 now changed to "if byWhom ="NonProf" then." This user request message containing the modified line 14 is the redefinition of the class, originally created in box 610. This redefinition of the class 610 is then saved in the class database at step 670.

FIG. 6 does not illustrate the only steps to use classes and objects to create a software application. Those skilled in the art will realize that variations on how to use and/or define such classes and objects exist. For example, objects may be defined containing its own data and method definitions (i.e., its own class definition), thereby eliminating the need to have classes created. In this embodiment, each object contains not only its own object definition (e.g., Table II text), but also a class definition (e.g., Table I text). Thus, if another object of the same class is desired to be created, that object contains its own object definition (e.g., similar to Table II but containing values pertinent to that object) and the same class definition (e.g., Table I test) contained in the other objects within that same class. However, to facilitate changes in data or method definition to one class rather than in a number of objects, it is preferred that classes be created.

Those skilled in the art will also recognize that the methods and systems of the present invention have many applications, and the present invention is not limited to the representative enclosed herein. All modifications, variations, or equivalent arrangements and implementations that are within the scope of the attached claims should therefore be considered within the scope of the invention.

We claim:

1. A method of providing a computer user with an object programming environment, the method comprising:

a) receiving a user request message that specifies a class, where such message determines a data definition and a method definition of the class;

b) saving a class record into a database that maintains class data comprising class object definition, data definition, and method definition specified by the class specification, thereby providing an object programming environment that supports object class creation and instantiation in response to the user request message without compilation of object source code.

2. The method of claim 1 where said class is saved in a relational database.

3. The method of claim 1 where said class is used in a software application.

4. The method of claim 1 where said data definition and method definition are delimited using XML.

5. The method of claim 1 where said method definition contains one or more methods written in a scripting language.

6. The method of claim 1, with steps further comprising:
    a) redefining said class; and
    b) saving said redefined class in a computer-readable medium.

7. A method as defined in claim 1, further including the steps of:
    a) defining object(s) based on said class; and
    b) saving said object(s) in a computer-readable medium.

8. The method of claim 7 where said object is saved in a relational database.

9. The method of claim 7 where said object is used in a software application.

10. The method of claim 7 where said object contains a data definition and optionally a method definition.

11. The method of claim 10 where said data definition or optional method definition is delimited using XML.

12. The method of claim 10 where said optional method definition contains one or more methods written in a scripting language.

13. A method as defined in claim 7, further including the steps of:
    a) modifying said object(s); and
    b) saving said object(s) in a computer-readable medium.

14. A method as defined in claim 7, further including the steps of:
    a) receiving a user request message to execute said object's method(s); and
    b) executing said object's method(s).

15. A method as defined in claim 14 where said receiving a user request message means is by a software written in a high level language.

16. A method as defined in claim 14 where said receiving a user request message means is by a script processed by a web server software.

17. A method as defined in claim 14 where said executing means is by a web server software.

18. A method as defined in claim 1, wherein the data definition and method definition of the class are delimited by tags.

19. A method of providing a computer user with an object programming environment, the method comprising:
    a) receiving a user request message that specifies an object where such message determines a data definition and a method definition of the object;
    b) saving an object record into a database that maintains object data comprising an object ID number, data definition, and method definition of the specified object, thereby providing an object programming environment that supports object class creation and instantiation in response to the user request message without compilation of object source code.

20. The method of claim 19 where said object is saved in a relational database.

21. The method of claim 19 where said object is used in a software application.

22. The method of claim 19 where said data definition and method definition are delimited using XML.

23. The method of claim 19 where said method definition contains one or more methods written in a scripting language.

24. The method of claim 19, with steps further comprising:
    a) redefining said object; and
    b) saving said redefined object in a computer-readable medium.

25. A method as defined in claim 19, further including the steps of:
    a) receiving a user request message to execute said object's method(s); and
    b) executing said object's method(s).

26. A method as defined in claim 25 where said receiving a user request message means is by a software written in a high level language.

27. A method as defined in claim 25 where said receiving a user request message means is by a script processed by a web server software.

28. A method as defined in claim 25 where said executing means is by a web server software.

29. A method as defined in claim 19, wherein the data definition and method definition of the class are delimited by tags.

30. A system for providing a computer user with an object programming environment, the system comprising:
    an Object Services system (OSS) that receives a computer user request message that specifies data definitions and class definitions for object classes;
    an object programming database that receives a computer user request message that identifies data objects in accordance with the object classes and that stores data comprising data definitions and method definitions of the object classes;
    wherein the OSS receives a computer user request message to instantiate one or more of the data objects and modifies the object programming database to implement the instantiation request message;
    the said OSS comprises:
        a class definer where said class definer enables a user to define a class by defining a data definition and method definition for said class using tags; and
        an object definer where said object definer enables a user to define an object by defining a data definition and optionally a method definition for said object using tags;
    wherein the object programming database comprises:
        a class database to save said class and where said class may be modified; and
        an object database to save said object and where said object may be modified; and
        the said OSS further comprises a message receiver where said message receiver receives a user request message and said message receiver sends instructions to the object programming database, thereby providing an object programming environment that supports object class creation and instantiation in response to the user request message without compilation of object source code.

31. A system as defined in claim 30, further including a server that receives the user request messages and communicates with the OSS and object programming database concerning requested action of the request messages.

32. A system of claim 30 where said class database is saved in a relational database management system.

33. A system of claim 30 where said object database is saved in a relational database management system.

34. A system of claim 30 further comprising:

a relational database management system.

35. A system for providing a computer user with an object programming environment, the system comprising:

a) a message receiver where said message receiver receives a message and said message receiver sends instructions, including instructions to create or modify class(es) and or object(s); and b) a class database in which said classes are saved and where said classes may be modified;

c) an object database in which said objects are saved and where said objects may be modified;

d) a web server software that receives and executes instructions relating to class creation and instantiation in response to the user request message, without compilation of object source code.

36. A system of claim 35 further comprising:

a relational database management system.

* * * * *

UNITED STATES PATENT AND TRADEMARK OFFICE
CERTIFICATE OF CORRECTION

PATENT NO.    : 6,567,819 B1
DATED         : May 20, 2003
INVENTOR(S)   : Cheng et al.

It is certified that error appears in the above-identified patent and that said Letters Patent is hereby corrected as shown below:

<u>Column 15,</u>
Line 11, please replace claim 35 with the following claim:

35.    A system for providing a computer user with an object programming environment, the system comprising:
    a) a message receiver where said message receiver receives a request message and said message receiver sends instructions, including instructions to create or modify class(es) and or object(s); and
    b) a class database in which said classes are saved and where said classes may be modified;
    c) an object database in which said objects are saved and where said objects may be modified;
    d) a web server software that receives and executes instructions relating to class creation and instantiation in response to the user request message, without compilation or object source code.

Signed and Sealed this

Ninth Day of March, 2004

JON W. DUDAS
*Acting Director of the United States Patent and Trademark Office*